US012750872B2

(12) United States Patent
Niu et al.

(10) Patent No.: US 12,750,872 B2
(45) Date of Patent: Sep. 29, 2026

(54) MODE 2 RESOURCE SELECTION ENHANCEMENT

(71) Applicant: Apple Inc., Cupertino, CA (US)

(72) Inventors: Huaning Niu, San Jose, CA (US); Weidong Yang, San Diego, CA (US); Haitong Sun, Cupertino, CA (US); Seyed Ali Akbar Fakoorian, San Diego, CA (US); Dawei Zhang, Saratoga, CA (US); Sigen Ye, San Diego, CA (US); Wei Zeng, Saratoga, CA (US); Chunxuan Ye, San Diego, CA (US); Ankit Bhamri, Bad Nauheim (DE)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 18/360,281

(22) Filed: Jul. 27, 2023

(65) Prior Publication Data

US 2024/0057134 A1 Feb. 15, 2024

Related U.S. Application Data

(60) Provisional application No. 63/397,101, filed on Aug. 11, 2022.

(51) Int. Cl.
*H04W 72/40* (2023.01)
*H04W 74/08* (2024.01)
*H04W 74/0808* (2024.01)

(52) U.S. Cl.
CPC ....... *H04W 72/40* (2023.01); *H04W 74/0808* (2013.01)

(58) Field of Classification Search
CPC .......................... H04W 72/40; H04W 74/0808
USPC .......................................................... 370/329
See application file for complete search history.

(56) References Cited

U.S. PATENT DOCUMENTS

| | | | | |
|---|---|---|---|---|
| 2020/0146044 | A1 * | 5/2020 | Maaref | H04W 72/02 |
| 2021/0243749 | A1 * | 8/2021 | Hoang | H04W 72/02 |
| 2022/0312379 | A1 * | 9/2022 | Xue | H04W 28/0289 |
| 2024/0015744 | A1 * | 1/2024 | Peng | H04W 72/044 |
| 2024/0049283 | A1 * | 2/2024 | Elazzouni | H04W 74/002 |
| 2024/0057134 | A1 * | 2/2024 | Niu | H04W 74/0808 |

(Continued)

OTHER PUBLICATIONS

3rd Generation Partnership Project; Technical Specification Group Radio Access Network; Physical layer procedures for shared spectrum channel access (Release 17); 3GPP TS 37.213 V17.2.0; Jun. 2022.

(Continued)

*Primary Examiner* — Faisal Choudhury
(74) *Attorney, Agent, or Firm* — Eschweiler & Potashnik, LLC; Ningjiao Zhang

(57) ABSTRACT

A user equipment (UE), a baseband processor or other network device can operate in a new radio (NR) unlicensed network to correlate resource selection with shared spectrum channel access. The device can perform a resource selection procedures within a resource selection window (RSW) to determine a set of candidate resources, and a clear channel assessment (CCA). A resource selection of one or more resources can be performed from the set of candidate resources to enable a sidelink (SL) communication. The CCA initiates after an aperiodic traffic arrival, after a previous transmission, or after the resource selection is completed.

22 Claims, 11 Drawing Sheets

(56) References Cited

U.S. PATENT DOCUMENTS

| | | | | |
|---|---|---|---|---|
| 2024/0430912 | A1* | 12/2024 | Chen | H04W 74/0808 |
| 2025/0159710 | A1* | 5/2025 | Xue | H04W 72/40 |
| 2025/0159727 | A1* | 5/2025 | Qi | H04W 72/25 |
| 2025/0227722 | A1* | 7/2025 | Park | H04W 72/25 |
| 2025/0247858 | A1* | 7/2025 | Talarico | H04W 74/0808 |

OTHER PUBLICATIONS

3rd Generation Partnership Project; Technical Specification Group Radio Access Network; Study on evaluation methodology of new Vehicle-to-Everything (V2X) use cases for LTE and NR; (Release 15); 3GPP TR 37.885 V15.3.0; Jun. 2019.

3rd Generation Partnership Project; Technical Specification Group Radio Access Network; Study on NR-based access to unlicensed spectrum (Release 16); 3GPP TR 38.889 V16.0.0; Dec. 2018.

* cited by examiner

MODE 2 RESOURCE SELECTION ENHANCEMENT

REFERENCE TO RELATED APPLICATIONS

This application claims the benefit of U.S. Provisional Application No. 63/397,101, filed on Aug. 11, 2022, the contents of which are hereby incorporated by reference in their entirety

FIELD

The present disclosure relates to wireless technology, and to enhancements in mode 2 resource selection.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria to provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions. Another type of mobile communication includes vehicle communication, where vehicles communicate or exchange vehicle related information. The vehicle communication can include vehicle to everything (V2X) devices or a V2X user equipment (UE), which includes vehicle to vehicle (V2V), vehicle to infrastructure (V2I) and vehicle to pedestrian (V2P) where direct communication without a base station may be employed, such as in a sidelink (SL) communication. In some situations, vehicle related information is intended for a single vehicle or other entity. In other situations, such as emergency alerts, vehicle related information is intended for a large number of vehicles or other devices or component entities. The emergency alerts can include collision warnings, control loss warnings, and the like.

DETAILED DESCRIPTION

Figure 1:
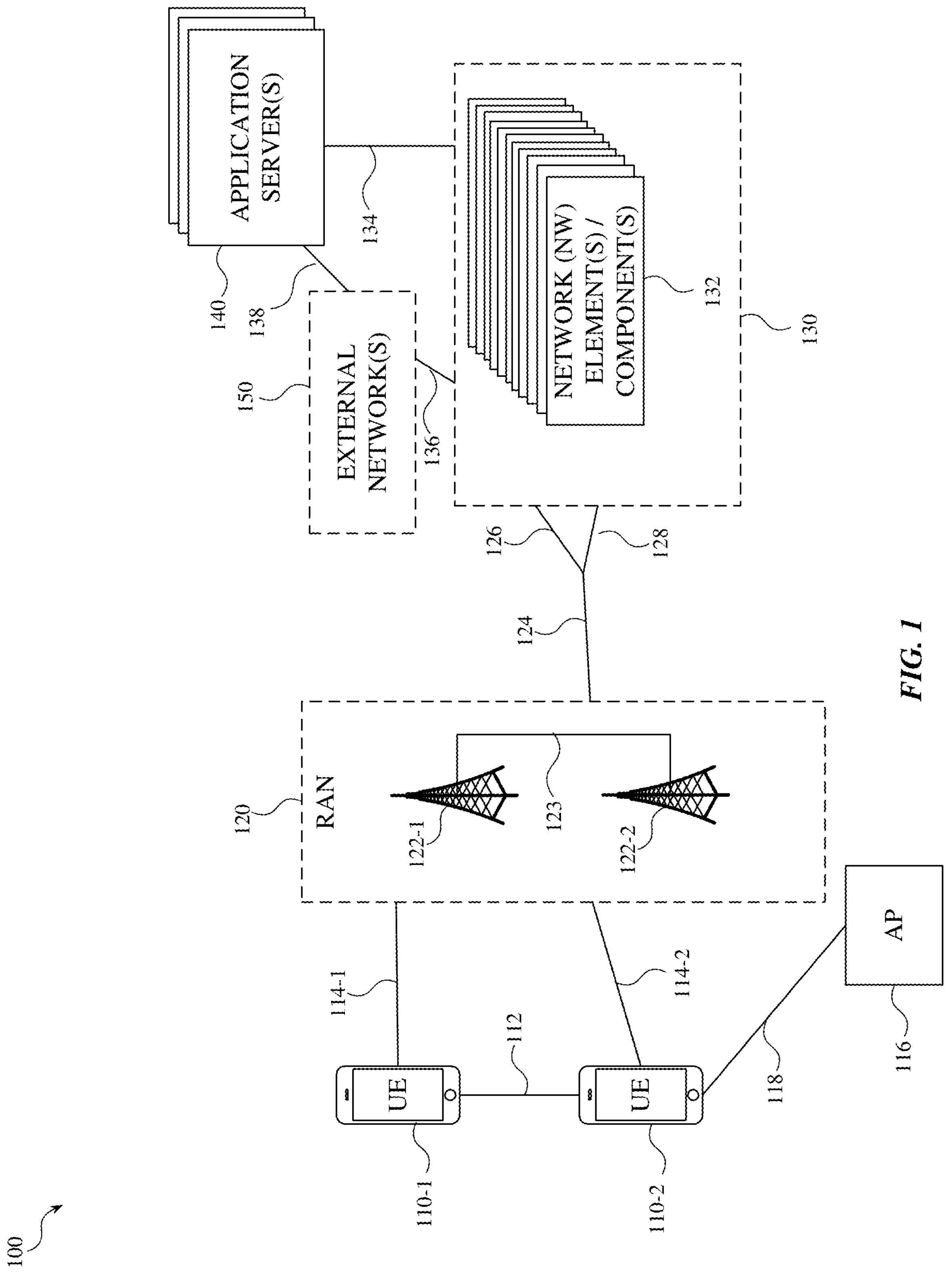
FIG. 1 illustrates an exemplary block diagram illustrating an example of user equipment(s) (UEs) communicatively coupled a network with network components as peer devices useable in connection with various embodiments (aspects) described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Various aspects include configuring of mode 2 resource selection in association with, or corresponding to, shared spectrum channel access. Similar to V2X UE and non-vehicle UEs, solutions for channel access for mode 1 and mode 2 are described in this disclosure, and especially with respect to mode 2.

When a UE operates in SL mode, it may cycle between active and inactive times, as well as sensing resources and selecting resources, while sharing channel access with clear channel assessment (CCA) operations. As such, merging support of resource selection (e.g., in SL unlicensed communication (SL-U)) when applicable to unlicensed bands with CCA procedures can enable seamless operation with reduced latency. For example, a UE in SL-U communication can perform a resource selection procedure within a resource selection window (RSW) to determine a set (one or more) of candidate resources. In an aspect, the RSW can initiate at a time that is during or after a CCA. Alternatively, or additionally, the CCA initiates after an aperiodic traffic arrival, after a previous transmission is completed, or after the resource selection is completed. Depending on the configuration between resource selection and CCA for SL-U, various aspects are further detailed herein. The UE can then further perform resource selection of resources from the candidate resources to enable the SL communication.

Two different types of categories of sidelink communication are known based on the resource allocation method configured: mode 1 communication and mode 2 communication. Mode 1 communication includes SL communications where a base station (e.g., gNB or eNB) allocates usable resources for direct communication between terminals (different UEs) and can be used when all terminals that perform sidelink communication are in an in-coverage situation. In contrast, mode 2 communication is a method where each UE selects usable resources for direct communication and can be used even when the terminals are in an out-of-coverage situation. Because the base station does not intervene in resource allocation for mode 2 communication, the UE identifies the usable resources itself. Sensing is used for identifying resources that can be selected to be used for the sidelink, in order to decode the physical sidelink control channel (PSCCH) during a resource sensing window of a certain period before performing the sidelink transmission. However, while sensing and resource selection can operate fairly seamlessly with CCA operations in periodic traffic, in which traffic is arriving at periodic or regular intervals, sensing and resource selection can potentially conflict at times with aperiodic traffic. In addition, sensing for resource selection and sensing for CCA can be different from one another. While sensing for resource selection identifies resources within a sensing window for selection of resources in an RSW to be used for transmission, sensing for CCA is to identify or reserve the channel in a mechanism that determines whether the medium is idle or not for a fair channel co-existence among neighboring UEs. Thus, various aspects envision continuing seamless SL communications, especially in mode 2 SL-U with aperiodic traffic across resource selection methods and CCA operations. Additional aspects and details of the disclosure are further described below with reference to figures.

FIG. 1 is an example network 100 according to one or more implementations described herein. Example network 100 can include UEs 110-1, 110-2, etc. (referred to collectively as "UEs 110" and individually as "UE 110"), a radio access network (RAN) 120, a core network (CN) 130, application servers 140, or external networks 150.

The systems and devices of example network 100 can operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 can operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 can include smartphones (e.g., handheld touchscreen mobile computing devices connectable to one or more wireless communication networks). Additionally, or alternatively, UEs 110 can include other types of mobile or non-mobile computing devices capable of wireless communications, such as personal data assistants (PDAs), pagers, laptop computers, desktop computers, wireless handsets, etc. In some implementations, UEs 110 can include internet of things (IoT) devices (or IoT UEs) that can comprise a network access layer designed for low-power IoT applications utilizing short-lived UE connections. Additionally, or alternatively, an IoT UE can utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Additionally, UEs 110 can be NTN UEs that are capable of being communicatively coupled to satellites in an NTN network.

UEs 110 can communicate and establish a connection with (be communicatively coupled to) RAN 120, which can involve one or more wireless channels 114-1 and 114-2, each of which can comprise a physical communications interface/layer. In some implementations, a UE can be configured with dual connectivity (DC) as a multi-radio access technology (multi-RAT) or multi-radio dual connectivity (MR-DC), where a multiple receive and transmit (Rx/Tx) capable UE can use resources provided by different network nodes (e.g., 122-1 and 122-2) that can be connected via non-ideal backhaul (e.g., where one network node provides NR access and the other network node provides either E-UTRA for LTE or NR access for 5G). In such a scenario, one network node can operate as a master node (MN) and the other as the secondary node (SN). The MN and SN can be connected via a network interface, and at least the MN can be connected to the CN 130. Additionally, at least one of the MN or the SN can be operated with shared spectrum channel access, and functions specified for UE 110 can be used for an integrated access and backhaul mobile termination (IAB-MT). Similar for UE 110, the IAB-MT can access the network using either one network node or using two different nodes with enhanced dual connectivity (EN-DC) architectures, new radio dual connectivity (NR-DC) architectures, or other direct connectivity such as a sidelink (SL) communication channel as an SL interface 112.

In some implementations, a base station (as described herein) can be an example of network node 122. As shown, UE 110 can additionally, or alternatively, connect to access point (AP) 116 via connection 118, which can include an air interface enabling UE 110 to communicatively couple with AP 116. AP 116 can comprise a wireless local area network (WLAN), WLAN node, WLAN termination point, etc. The connection 118 can comprise a local wireless connection, such as a connection consistent with any IEEE 702.11 protocol, and AP 116 can comprise a wireless fidelity (Wi-Fi®) router or other AP. AP 116 could be also connected to another network (e.g., the Internet) without connecting to RAN 120 or CN 130.

RAN 120 can also include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 can include network access points configured to provide radio baseband functions for data or voice connectivity between users and the network based on one or more of the communication technologies described herein (e.g., 2G, 3G, 4G, 5G, WiFi, etc.). As examples therefore, a RAN node can be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 can include a roadside unit (RSU), a transmission reception point (TRxP or TRP), and one or more other types of ground stations (e.g., terrestrial access points). In some scenarios, RAN node 122 can be a dedicated physical device, such as a macrocell base station, or a low power (LP) base station for providing femtocells, picocells or other like having smaller coverage areas, smaller user capacity, or higher bandwidth compared to macrocells.

Some or all of RAN nodes 122 can be implemented as one or more software entities running on server computers as part of a virtual network, which can be referred to as a centralized RAN (CRAN) or a virtual baseband unit pool (vBBUP). In these implementations, the CRAN or vBBUP can implement a RAN function split, such as a packet data convergence protocol (PDCP) split wherein radio resource control (RRC) and PDCP layers can be operated by the CRAN/vBBUP and other Layer 2 (L2) protocol entities can be operated by individual RAN nodes 122; a media access control (MAC)/physical (PHY) layer split wherein RRC, PDCP, radio link control (RLC), and MAC layers can be operated by the CRAN/vBBUP and the PHY layer can be operated by individual RAN nodes 122; or a "lower PHY" split wherein RRC, PDCP, RLC, MAC layers and upper portions of the PHY layer can be operated by the CRAN/vBBUP and lower portions of the PHY layer can be operated by individual RAN nodes 122. This virtualized framework can allow freed-up processor cores of RAN nodes 122 to perform or execute other virtualized applications.

In some implementations, an individual RAN node 122 can represent individual gNB-distributed units (DUs) connected to a gNB-control unit (CU) via individual F1 interfaces. In such implementations, the gNB-DUs can include one or more remote radio heads or radio frequency (RF) front end modules (RFEMs), and the gNB-CU can be operated by a server (not shown) located in RAN 120 or by a server pool (e.g., a group of servers configured to share resources) in a similar manner as the CRAN/vBBUP. Additionally, or alternatively, one or more of RAN nodes 122 can be next generation eNBs (i.e., gNBs) that can provide evolved universal terrestrial radio access (E-UTRA) user plane and control plane protocol terminations toward UEs 110, and that can be connected to a 5G core network (5GC) 130 via an NG interface.

Any of the RAN nodes 122 can terminate an air interface protocol and can be the first point of contact for UEs 110. In some implementations, any of the RAN nodes 122 can fulfill various logical functions for the RAN 120 including, but not limited to, radio network controller (RNC) functions such as radio bearer management, uplink and downlink dynamic radio resource management and data packet scheduling, and mobility management. UEs 110 can be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations can not be limited in this regard. The OFDM signals can comprise a plurality of orthogonal subcarriers.

Further, RAN nodes 122 can be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum can include channels that operate in a frequency range (e.g., approximately 400 MHz to approximately 3.8 GHz, or other range). In some regions, the unlicensed spectrum can include about the 5 GHz band, for example, or other frequency bands. A licensed spectrum can correspond to channels or frequency bands selected, reserved, regulated, etc., for certain types of wireless activity (e.g., wireless telecommunication network activity), whereas an unlicensed spectrum can correspond to one or more frequency bands that are not restricted for certain types of wireless activity. Whether a particular frequency band corresponds to a licensed medium or an unlicensed medium can depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 can operate using licensed assisted access (LAA), eLAA, and/or feLAA mechanisms. In these implementations, UEs 110 and the RAN nodes 122 can perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol or a clear channel assessment (CCA).

A physical downlink shared channel (PDSCH) can carry user data and higher layer signaling to UEs 110. The physical downlink control channel (PDCCH) can carry information about the transport format and resource allocations related to the PDSCH channel, among other things. The PDCCH can also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) can be performed at any of the RAN nodes 122 based on channel quality information fed back from any of UEs 110. The downlink resource assignment information can be sent on the PDCCH used for (e.g., assigned to) each of UEs 110.

The PDCCH uses control channel elements (CCEs) to convey the control information, wherein a number of CCEs (e.g., 6 or the like) can consists of a resource element groups (REGs), where a REG is defined as a physical resource block (PRB) in an OFDM symbol. Before being mapped to resource elements, the PDCCH complex-valued symbols can first be organized into quadruplets, which can then be permuted using a sub-block interleaver for rate matching, for example. Each PDCCH can be transmitted using one or more of these CCEs, where each CCE can correspond to nine sets of four physical resource elements known as REGs. Four quadrature phase shift keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, 8, or 16).

The RAN nodes 122 or RAN 120 can be configured to communicate with one another via interface 123. In implementations where the system is an LTE system, interface 124 can be an X2 interface. The X2 interface can be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface can include an X2 user plane interface (X2-U) 126 and an X2 control plane interface (X2-C) 128. The X2-U can provide flow control mechanisms for user data packets transferred over the X2 interface and can be used to communicate information about the delivery of user data between eNBs or gNBs. For example, the X2-U can provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C can provide intra-LTE access mobility functionality (e.g., including context transfers from source to target eNBs, user plane transport control, etc.), load management functionality, and inter-cell interference coordination functionality.

Alternatively, or additionally, RAN 120 can be also connected (e.g., communicatively coupled) to CN 130 via a Next Generation (NG) interface as interface 124. The NG interface 124 can be split into two parts, a Next Generation (NG) user plane (NG-U) interface 126, which carries traffic data between the RAN nodes 122 and a User Plane Function (UPF), and the S1 control plane (NG-C) interface 128, which is a signaling interface between the RAN nodes 122 and Access and Mobility Management Functions (AMFs).

CN 130 can comprise a plurality of network elements 132, which are configured to offer various data and telecommunications services to customers/subscribers (e.g., users of UEs 110) who are connected to the CN 130 via the RAN 120. In some implementations, CN 130 can include an evolved packet core (EPC), a 5G CN, and/or one or more additional or alternative types of CNs. The components of the CN 130 can be implemented in one physical node or separate physical nodes including components to read and execute instructions from a machine-readable or computer-readable medium (e.g., a non-transitory machine-readable storage medium).

As shown, CN 130, application servers 140, and external networks 150 can be connected to one another via interfaces 134, 136, and 138, which can include IP network interfaces. Application servers 140 can include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application servers 140 can also, or alternatively, be configured to support one or more communication services (e.g., voice over IP (VoIP sessions, push-to-talk (PTT) sessions, group communication sessions, social networking services, etc.) for UEs 110 via the CN 130. Similarly, external networks 150 can include one or more of a variety of networks, including the Internet, thereby providing the mobile communication network and UEs 110 of the network access to a variety of additional services, information, interconnectivity, and other network features.

Various aspects herein can include the UE 110-1 communicating in SL communication over the SL interface or channel 112 with peer UE 110-2, for example. In an aspect, UE 110-1 can communicate in SL communication to UE 110-2 over SL interface 112. Processing circuitry of the UE 110-1 can execute instructions to cause the UE to perform a resource selection procedure within a RSW to determine candidate resources. The RSW can be configured to initiate at a time that is during or after a CCA. Additionally, or alternatively, the CCA can initiate at a time of at least one of: after an aperiodic traffic arrival, after a previous transmission is completed, or after the resource selection is completed. Then the UE can select one or more resources from the set of candidate resources to enable the SL communication, which can be a Mode-2 (mode 2) SL communication where SL resources are without a base station or autonomously determined.

Figure 2:
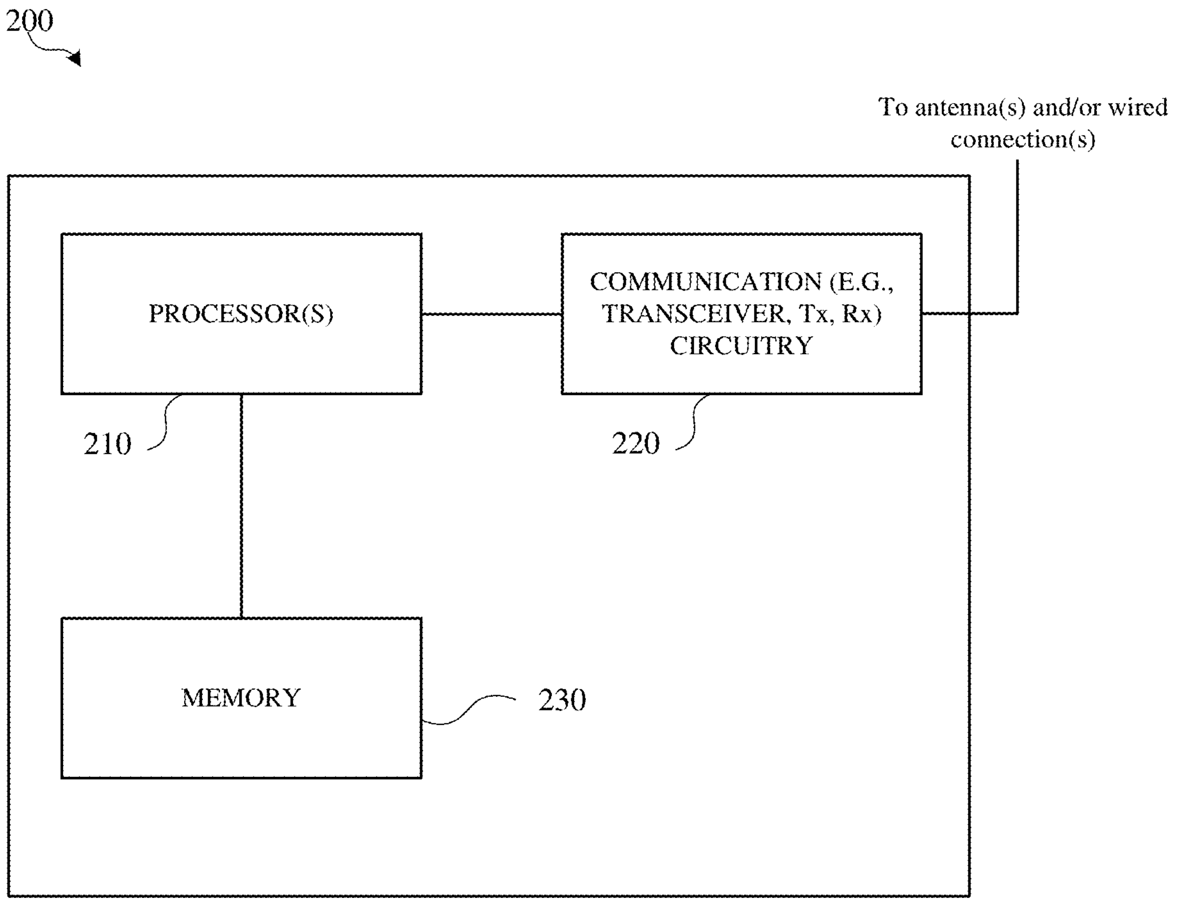
FIG. 2 illustrates an example simplified block diagram of a user equipment (UE) wireless communication device or other network device/component (e.g., eNB, gNB) in accordance with various aspects.

Referring to FIG. 2, illustrated is a block diagram of a UE device or other network device/component (e.g., V-UE/P-UE, IoT, gNB, eNB, or other participating network entity/component). The device 200 includes one or more processors 210 (e.g., one or more baseband processors) comprising processing circuitry and associated interface(s), transceiver circuitry 220 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 230 (which can comprise any of a variety of storage mediums and can store instructions and/or data associated with one or more of processor(s) 210 or transceiver circuitry 220).

Memory 230 (as well as other memory components discussed herein, e.g., memory, data storage, or the like) can comprise one or more machine-readable medium/media including instructions that, when performed by a machine or component herein cause the machine or other device to perform acts of a method, an apparatus or system for communication using multiple communication technologies according to aspects, embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Any connection can be also termed a computer-readable medium.

Memory 230 can include executable instructions, and be integrated in, or communicatively coupled to, processor or processing circuitry 210. The executable instructions of the memory 230 can cause processing circuitry 210 to perform a resource selection procedure within a RSW to determine candidate resources. The RSW can initiate at a time that is during or after a clear channel assessment (CCA). Alternatively, or additionally, the CCA initiates according to at least one of: after an aperiodic traffic arrival, after a previous transmission is completed, or after the resource selection is completed. Resources can then be selected from the candidate resources to enable a sidelink (SL) communication in SL-U.

Mode 2 resource selection procedures can include identifying candidate resources. For example, the RSW ($n+T_1$, $n+T_2$) can be determined according to RSW parameters, including duration, position, etc., with total number of candidate resources $M_{total}$. A sensing window [$n-T_0$, $n-T_{proc,0}$) can also be determined, as well as an initial set of RSRP threshold values be obtained. An initial resource candidate set $S_A$ can be set to include all the resources (e.g., $M_{total}$) in the RSW. Additionally, the UE can exclude candidate resources from $S_A$, if the UE 110 receives sidelink control information (SCI) with a reservation of the candidate resource(s); additionally, the UE can exclude resources with an RSRP measurement that is higher than the RSRP thresholds (depending also on data priority level of the reserving SCI), for example. Further, if the number of resources in $S_A$ is smaller than $X*M_{total}$, where X is an integer, then the UE increase 3 dB on RSRP threshold, and processes for selection or reselection can be further iterated accordingly; otherwise, the UE can report $S_A$ to a higher layer. In general, the resource selection process described above is optimized for periodic traffic model. As described in further detail herein, however, processes for aperiodic traffic arrivals may be helpful in some cases and can be further optimized for seamless SL-U communications, especially in Mode 2, but at places Mode 1 also.

Existing sidelink mode 2 resource allocation schemes are supported as a baseline for sidelink operation in a shared carrier, subject to applicable regional regulations. At least in dynamic channel access, an SL UE (e.g., UE 110) can perform Type 1 (complete CCA with a random backoff number generation) or one of the Type 2 LBTs (shorter CCAs than Type 1) before SL transmission using the selected or reserved resources, in compliance with transmission gap and LBT sensing idle times. To maintain a quality of service and seamlessness, updates to mode 2 resource selection procedure in particular can be due to shared spectrum channel access, especially with an objective for a common solution for channel access for mode 1 and mode 2 SL communication. While reservation schemes are present for mode 1 and 2 when traffic is periodic, this is not the case when traffic is random or aperiodic, especially with commercial traffic when a packet size may be reduced by a factor or with varying arrival rates. Thus, schemes with coordination between resource selection and CCA processes for reservation can be enhanced.

The device 200 can be configured similarly as UE 110-1 to communicate in SL communication to UE 110-2 over SL interface 112. The UE 110-1 can execute instructions to perform a resource selection procedure within a RSW to determine candidate resources. The RSW can be configured to initiate at a time that is during or after a CCA. Additionally, or alternatively, the CCA can initiate at a time of at least one of: after an aperiodic traffic arrival, after a previous transmission is completed, or after the resource selection is completed. In some aspects, the traffic can be aperiodic, arriving in the UE buffer (e.g., storage 230) at different intervals, or periodic, arriving in the UE buffer at regular intervals. Then the UE can select one or more resources from the set of candidate resources to enable the SL communication, which can be a mode 2 SL communication where SL resources are without a base station or autonomously determined.

Figure 3:
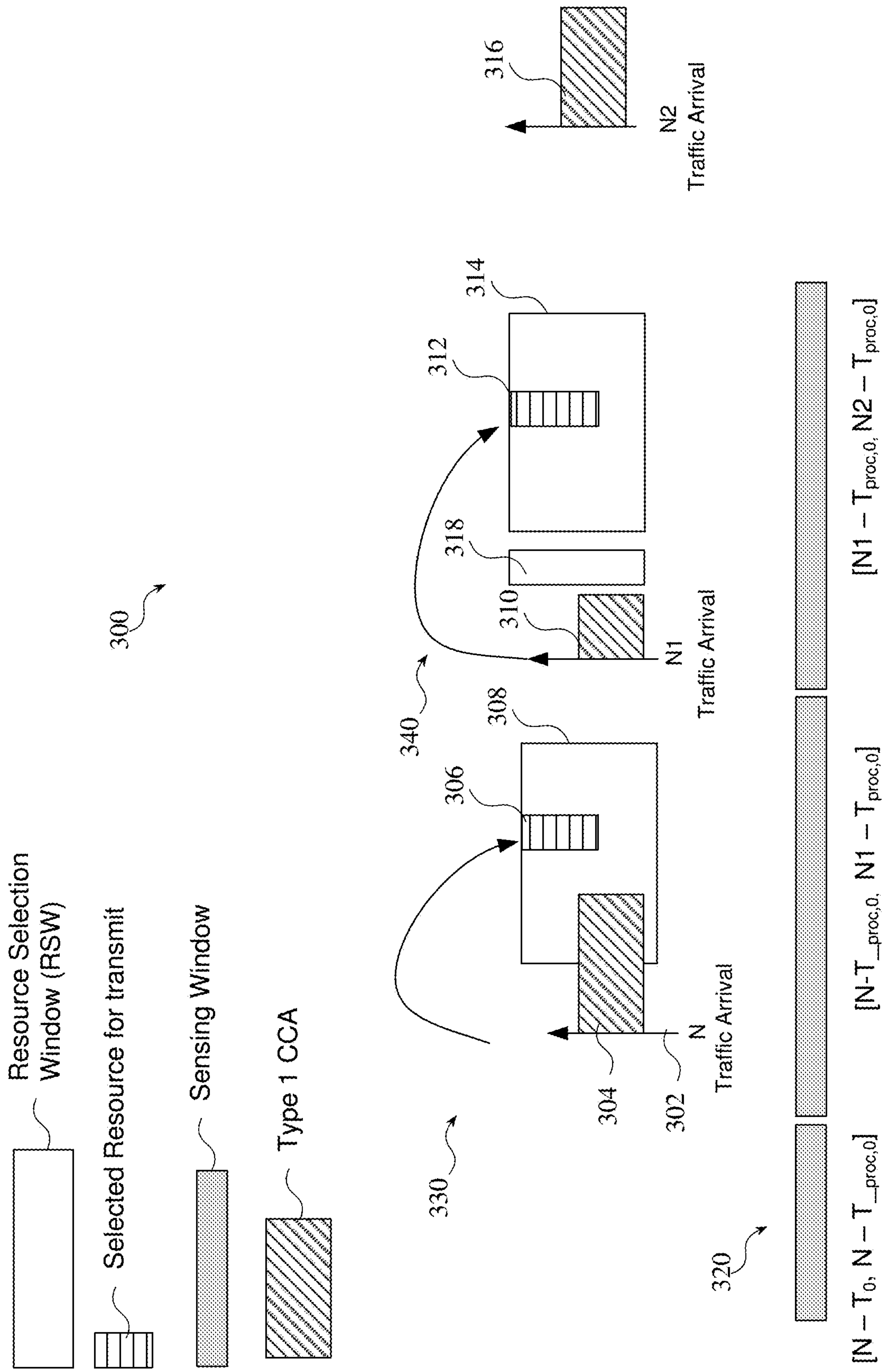
FIG. 3 illustrates an example of sidelink (SL) unlicensed communications including resource selection with clear channel assessment (CCA) processes in accordance with various aspects.

FIG. 3 illustrates an example 300 of CCA procedure timing in SL-U communications with a random traffic pattern. Traffic arrival occurs at N or time 302, which can be when traffic arrives in a UE buffer of the UE 110 causing the UE to perform CCA to obtain cannel access for transmission of data, for example. A CCA (e.g., type 1 CCA with a random backoff number generation) then initiates to sense whether the channel is idle or not as a part of fair co-channel coexistence procedures. If the channel is idle, a reservation (e.g., reservation 318) can be made so that neighboring UEs do not collide with transmissions over the same resource band. Then the UE is enabled to transmit on reserved resources. A resource selection window (RSW) 308, 314 for the selection potential candidates can be enabled either alongside the CCA, as in SL communication operations 330, for example, or after the CCA, as in SL communication operations 340, for example.

A selected resource 306 can be selected at traffic arrival and used for transmission within the RSW 308. Sensing for potential resource candidates continues to be done in the background continuously at sensing window intervals 320 (e.g., $[N-T_0, N-T_{-proc,0}]$; $[N-T_{-proc,0}, N1-T_{proc,0}]$; $N1-T_{proc,0}, N2-T_{proc,0}]$, etc.), $T_{Proc,0}$ is UE processing time of sensing, which is 1, 1, 2, 4 physical slots for 15, 30 60, 120 kHz SCS. Sensing is used for identifying resources that can be used for the sidelink, in order to decode the physical sidelink control channel (PSCCH) during a sensing window of a certain period before performing a sidelink transmission on a selected and available resource. The traffic arrival 302 can be aperiodic such that the UE receives data at irregular intervals or times at the grey arrows (N, N1, N2 traffic arrivals), even though the appearance of traffic arrivals in FIG. 1 may appear as periodic.

In an aspect, the SL communications 330 illustrates with a traffic arrival N 302 the initiation of the CCA 304. Overlapping with the CCA 304 and after the traffic arrival 302, is the RSW 308. The RSW 308 can at least partially overlap the CCA (e.g., type 1 CCA). The UE 110 can start CCA sensing immediately at the traffic arrival 302 when traffic arrives or is inputted into a UE buffer or memory (e.g., 230 of FIG. 2). Although the overlap between the CCA 304 and the RSW 308 is partial as illustrated, the RSW overlap can be complete or entirely overlapping with the CCA 304 (full complete or partial).

In an aspect, SL communications 340 illustrate another resource selection relationship with type 1 CCA 310, where resource selection window happens after type 1 CCA 310 is finished. Because type 1 CCA is random, in that it includes a random backoff number generation in configuration, CCA 304, 310, 316 can vary in duration from one another. SL communications 340 can have an advantage in that a reservation 318 can be sent after the CCA for the channel to be reserved when it is not already busy. A reservation is not necessarily required, and either of SL communications 330 or 340 could have a reservation 318 provided by the UE 110 after the CCA 304 or 310. The reservation has to be sent out after the CCA regardless, and if selected earlier then the channel conditions may have changed before completion.

Figure 4:
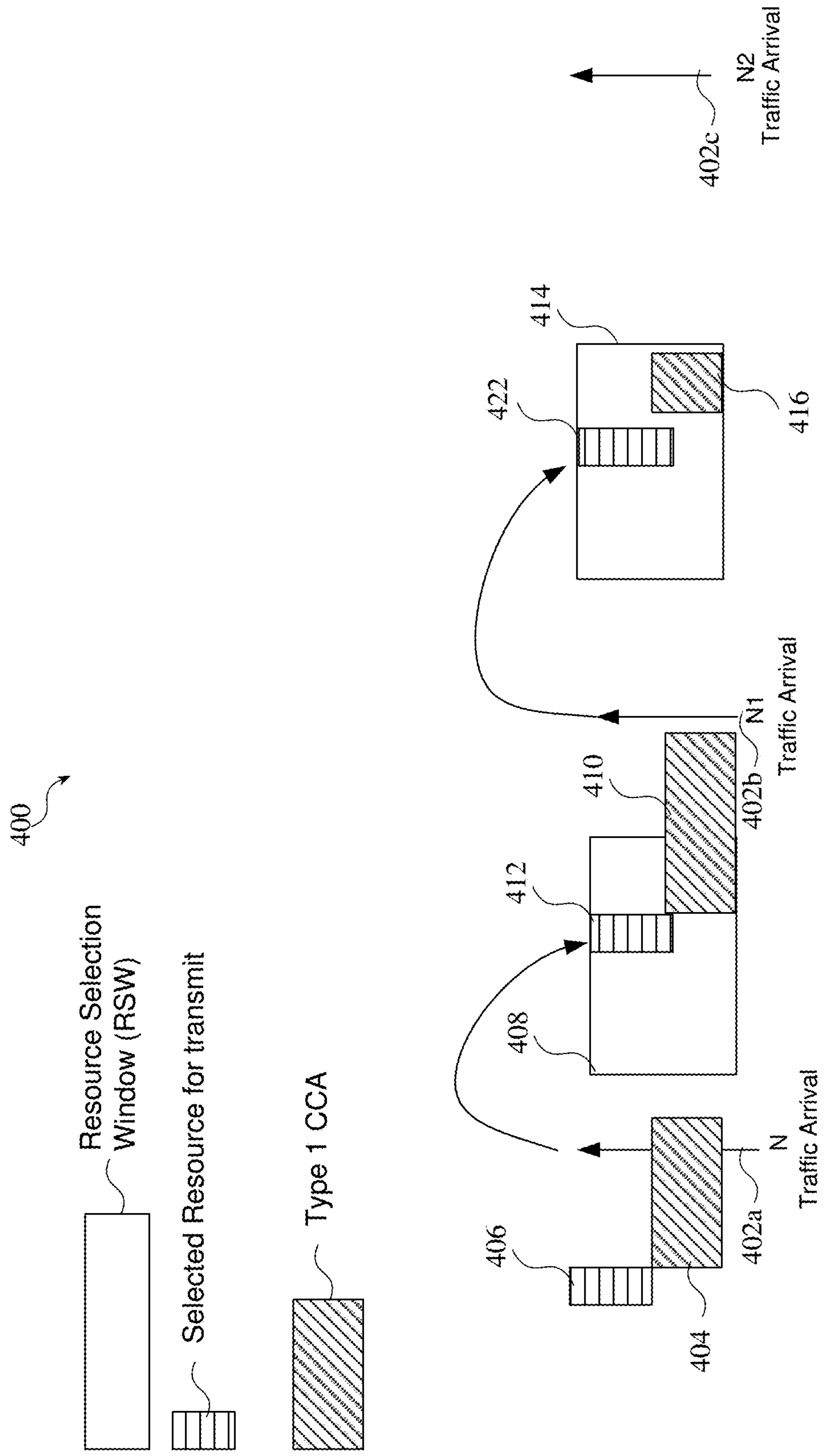
FIG. 4 illustrates another example of SL unlicensed communications including resource selection with CCA processes in accordance with various aspects.

FIG. 4 illustrates another example 400 of SL-U communications with CCA procedure timing for a random traffic pattern. Traffic arrival occurs at N or time 402, at various intervals that may be aperiodic from across traffic arrivals 402*a* thru 402*c* (or, "402") as traffic arrival N, traffic arrival N1, and traffic arrival N2. A CCA 404, 410, 416 (e.g., type 1 CCA with a random backoff number generation) initiates to sense whether the channel is idle. An RSW 408, 414 for the selection potential candidates can be enabled based on when a previous transmission 406, 412, 422 is completed, for example.

The SL-U communications 400 with CCA procedure timing is a variation of CCA timed sensing in relation to SL-U resource selection of FIG. 3 that is a more aggressive CCA 404, 410, 416. The UE 110, for example, can start CCA 404, 410, 416 after the previous transmission 406, 412, 422, respectively. Each resource selection can be a previous traffic transmission 406, 412, 422. Thus, after each transmission 406, 412, 422, UE 110 configures performance of the type 1 CCA random number, which can be immediately at or after a finished transmission. The UE 110 switches to a receiving mode to begin drawing a random number. Then a countdown is initiated with a counter/timer regardless of when the traffic arrives 402 (N, N1, N2, etc.) according to the random number.

In particular, the UE 110 can countdown for CCA before each traffic arrival 402*a* thru 402*c*. When traffic arrival 402 occurs, (e.g., at N, N1, N2, or the like), the UE 110 can freeze the counter for the reception and selection of traffic arrival N 402 in a UE buffer. In response to traffic arriving at 402, then the UE 110 can perform another one shot CCA (e.g., type 2 CCA) because it has already previously initiated count down. The countdown resumes and then transmission starts.

In another aspect, SL type 1 CCA can be configured to begin any time after a previous transmission is finished. In the example at traffic arrival 402 N of traffic in a UE buffer, the CCA (e.g., type 1 CCA) can be ongoing and overlap with the resource selection at traffic arrival. After transmission of a previous channel opportunity time (COT) (e.g., previous transmission 406, 412, 422), the UE 110 can immediately start the type 1 CCA with random backoff number generation. Resource selection can be performed at the traffic arrivals 402*a* thru 402*c*, and the CCA that is overlapping can be ongoing without a counter freeze.

Figure 5:
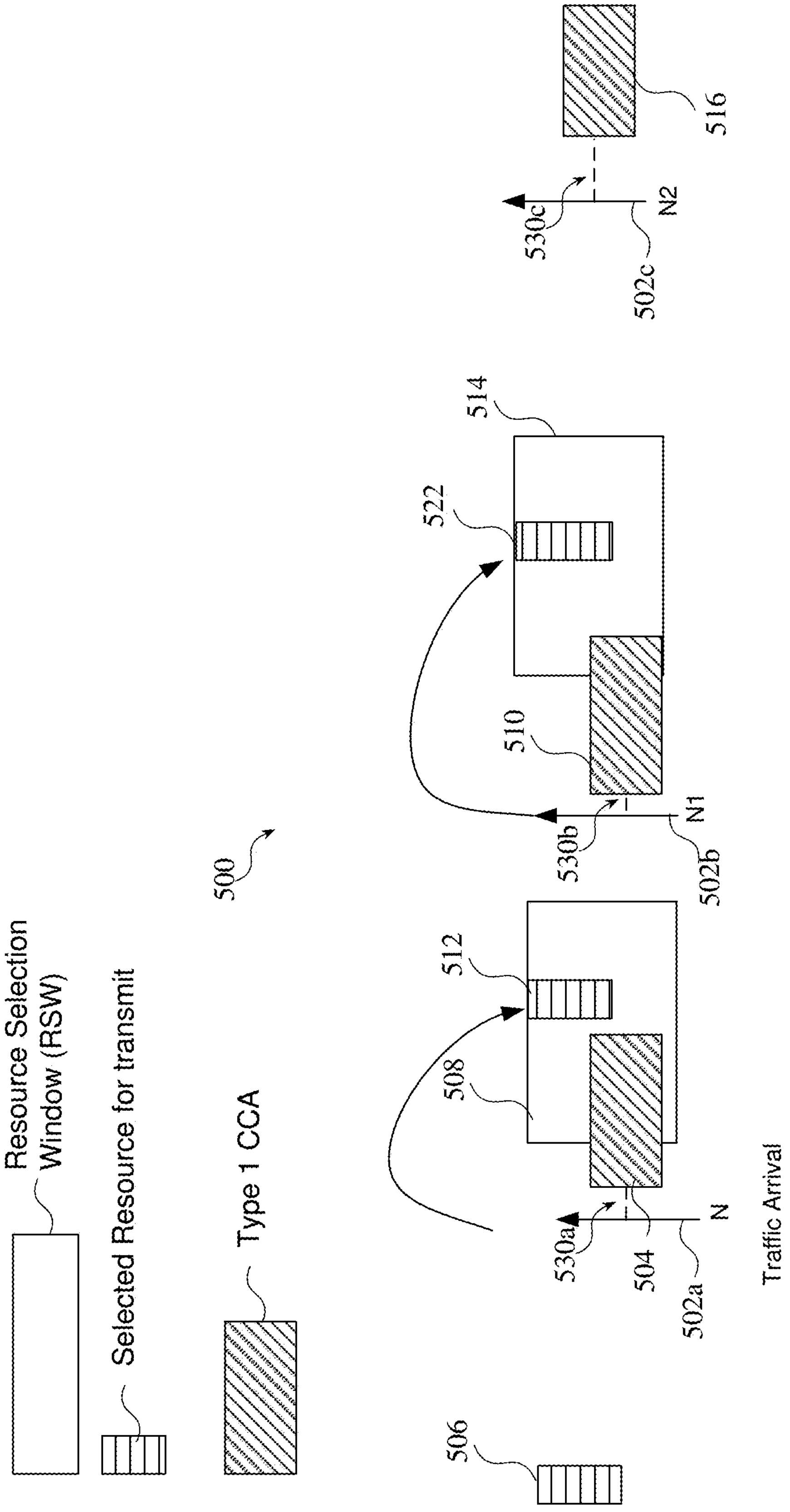
FIG. 5 illustrates another example of SL unlicensed communications including resource selection with CCA processes in accordance with various aspects

FIG. 5 illustrates another example 500 of SL-U communications with CCA procedure timing for a random traffic pattern with respect to resource re-selection. As illustrated here, traffic arrives at 502*a* thru 502*c* for different COTs, and CCA 504, 510, and 516 each start after resource selection is performed, which can be at each traffic arrival, with transmission 512, 522 subsequently following corresponding selections at traffic arrivals 502*a* and 502*b*, respectively.

For example, at the traffic arrival N 502*a* the UE 110 first performs resource selection for transmission at 512. After a resource selection at arrival 502*a*, the UE 110 starts the CCA 504 sensing before the selected resource is used for transmission and re-selection occurs during RSW 508. Once the UE 110 selects a resource, the UE 110 starts the CCA sensing before the selected resource is transmitted and a re-selection may occur. Thus, a gap 530*a*, 530*b*, 530*c* occurs between each aperiodic arrival 502*a*, 502*b*, 502*c* and the type 1 CCA 504, 510, 516.

In an aspect, if the UE 110 performs a resource reselection during the RSW 508, 514, and the CCA process overlapping, the UE can restart the type 1 CCA after resource reselection. Alternatively, or additionally, there may be no impact on the CCA after the resource reselection, during or before, and the UE continues to count down even if resource selection changes by reselection to another resource either in a re-evaluation before transmission 512, 522 or otherwise.

Figure 6:
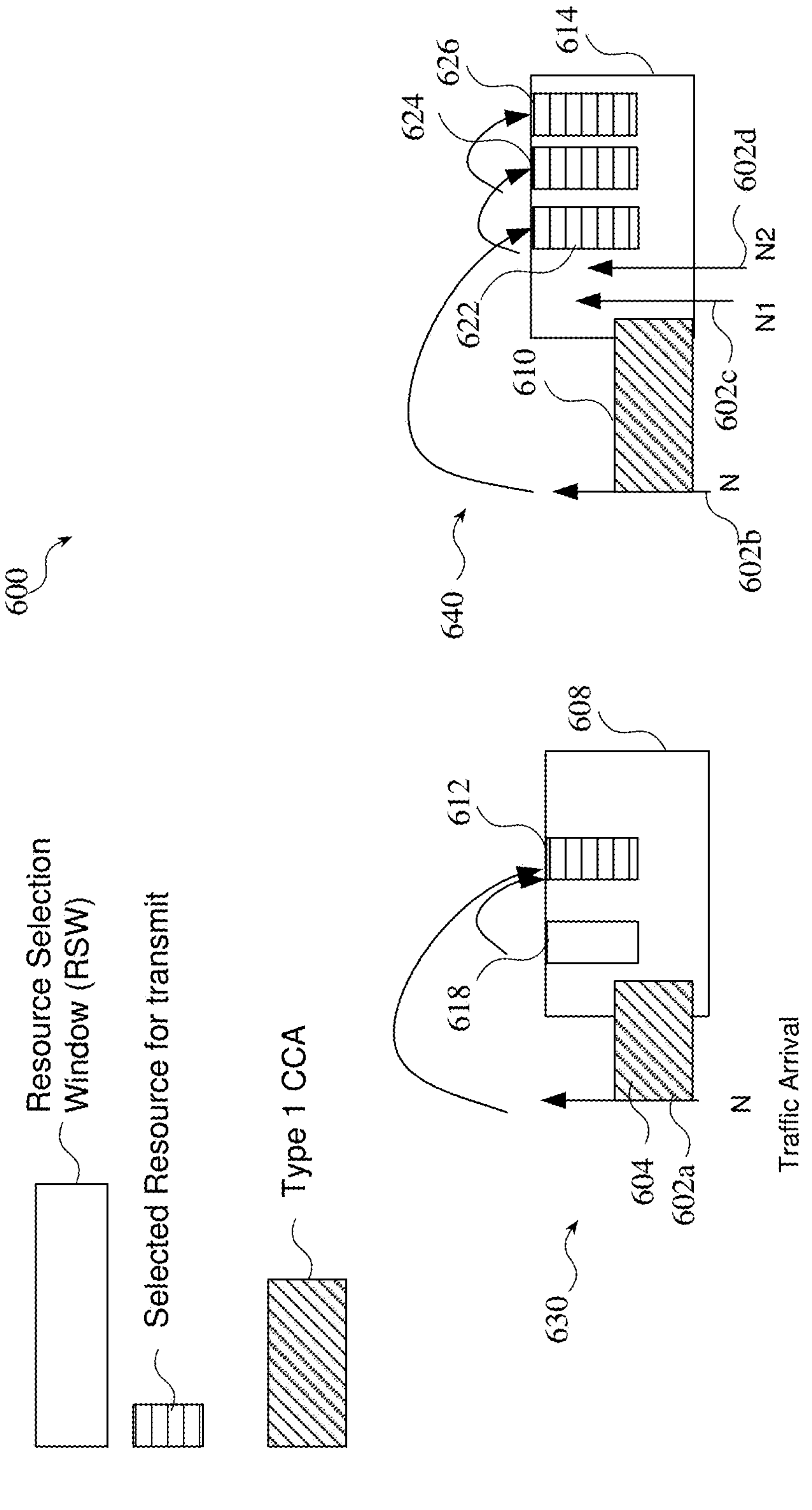
FIG. 6 illustrates an example of SL communications for resource reservation for an initial transmission or hybrid automatic repeat request (HARQ) (re)transmission in accordance with various aspects.

FIG. 6 illustrates an example of resource reservation procedures 600 for an initial transmission, and additional aspects include reservation for a HARQ re-transmission. As illustrated in FIG. 6, various aspects for reservation with respect to an initial transmission are envisioned by SL-U communication processes 630 and 640. In general, resource reservations for initial transmissions are optimal for periodic/regular traffic, which the reservation is piggybacked with a previous transmission. When the UE 110 is transmitting in a previous packet or COT, the UE 110 can already know when the next transmission is coming or being made; thus, the UE 110 can append a next reservation with the previous transmission at its finish or end for upcoming traffic. However, this may not be optimal for random/aperiodic traffic.

In an aspect, the UE 110 would not configure a reservation when there is aperiodic traffic. In other words, no reservation would be provided or allowed in scenarios where traffic arrival is aperiodic. When the UE 110 identifies aperiodic traffic, then reservations would not be configured for the initial transmission. The UE 110 would thus start transmission on any selected resource without any reservation at the risk of conflicts or collision occurring.

In another aspect, a standalone reservation can be signaled without being piggybacked to any previous or current traffic. Traffic arrivals 602*a*, 602*b*, 602*c*, 602*d* occur at N for processes 630 and N, N1, and N2 for processes 640. At processes 630, a resource reservation 618 can be generated in or outside of RSW 608 without any previous traffic or transmissions. Reservation 618 is made for the selected resource 312 for transmission independent of any previous traffic and without any traffic in the UE buffer (e.g., storage 230). Here, the UE buffer 230 of the UE is without traffic for an initial transmission, yet a reservation can still be made as a standalone reservation signal transmission for mode 2 SL-U communication in random/aperiodic traffic.

In an aspect, resource reservation for an initial transmission can be enabled only for traffic that remains or is queued in the UE buffer 230. For example, process 640 demonstrate that event though traffic arrival 602*b* and a CCA 610 with RSW 614 has occurred, other traffic arrivals (e.g., N1 602*c*, and N2 602*d*) traffic remains in the queue as selected candidates 622, 624 and 626. Each these selected resources can be reserved or correspond to a reservation for traffic in the UE buffer 230, for example, and is able to piggyback or be appended from a previous transmission. For example, resource 624 piggybacking or appended to the end of resource transmission 622, and resource 626 having a reservation appended to the end of transmission resource 624. As such, when traffic in the buffer 230 can have reservations piggy backed or appended to the previous reservation/resource transmission, but only for the traffic where at least one resource cannot be finished and remains in the queue or buffer 230 until the traffic is cleared from the queue.

In an aspect, UE 110 of claim 1, in response to being in SL-U mode 2 operation where traffic arrival could also be aperiodic, a standalone reservation signal transmission could initially be enabled that is independent of any previous transmission, or previous reservation, in which a UE buffer of the UE is without traffic for an initial transmission. Then the UE 110 could enable a reservation only for traffic within the UE buffer so that the reservation is piggy-backed or associated with the traffic within the UE buffer for the initial transmission. Alternatively, or additionally, a resource reservation for the initial transmission could be disabled entirely, in which case transmission could potentially still be made without reservation at the risk of collision or interference.

Various aspects can also be configured for resource reservations for HARQ re-transmission. In response to communicating with SL-U in mode 2, UE 110 can operate according to different aspects. For example, UE 110 could disable a HARQ re-transmission reservation for SL-U or aperiodic traffic conditions. Alternatively, or additionally, a HARQ retransmission reservation could be configured within a sidelink channel occupancy time (SL-COT) or SL-U transmission only. Alternatively, or additionally, an entire COT length of the SL-COT of a shared radio frequency band could operate as the HARQ retransmission reservation.

In some configurations, a maximum of three HARQ retransmission resources could be reserved. For example, even though the UE 110 may not have any HARQ feedback yet, some retransmission resources may still be reserved to ensure any HARQ transmission is successful. Then for SL unlicensed due to listen before talk (LBT), HARQ retransmission reservation may not entirely be efficient. Thus, one aspect is to disable HARQ retransmission reservation so that it may not be allowed.

Alternatively, or additionally, a HARQ retransmission reservation could only be allowed and configured within a sidelink COT, which may or may not be shared among UEs in SL-U. In particular, the COT length is related to the channel access priority class (CAPC), where we have priority 1, 2, 3, etc., as a CPAC priority, each priority being associated with COT length. Thus, HARQ retransmission could be configured to only be allowed within the SL COT. The COT length itself could also determine a number of HARQ re-transmissions able to be configured. The COT length thus dictates how many HARQ re-transmissions can be reserved or signaled by the UE 110. Once the UE 110 determines a number of HARQ re-transmissions it is able to reserve, the UE 110 can generate HARQ re-transmissions within the COT by using a one shot (type 2) CCA as part of the HARQ re-transmission.

In an aspect, the number of HARQ re-transmissions can depend on a physical sidelink feedback channel (PSFCH) timing, the CAPC, or whether a gap symbol is configured to be up to or greater than 25 us (microseconds). For example, a maximum number of HARQ retransmission reservations can be derived based on one or more of these parameters.

Alternatively, or additionally, the entire COT length could be treated as a reserved resource. A COT length can configured to be signaled in an SCI stage 1. If the UE 110, for example, performs a priority 3 CAPC procedure, acquires a COT length (e.g., 6 ms) to signal as the COT band, the COT length can be treated as if the entire COT length is a reserved resource. As such, all transmissions/re-transmissions within the COT length can be considered reserved by the UE 110, or other UEs for example.

Figure 7:
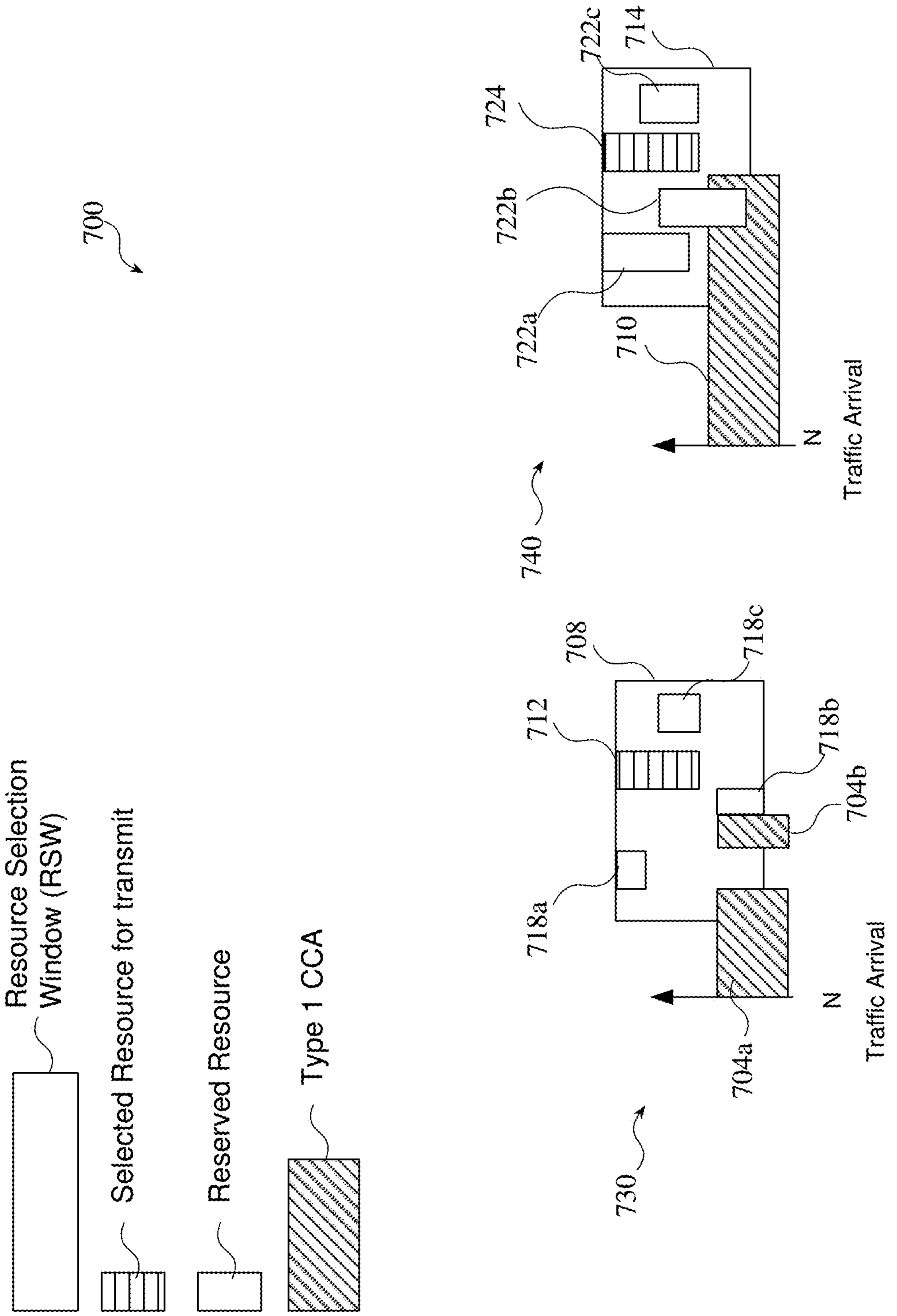
FIG. 7 illustrates an example of other user equipment (UE) CCA behavior on a reserved resource in SL communication in a network in accordance with various aspects.

FIG. 7 illustrates examples of SL-U communications 700 with CCA procedures with aperiodic/random traffic on reserved resources. Energy sensing can remain below an energy detection (ED) threshold, particularly if a reserve resource is only a partial LBT bandwidth (e.g., one or more physical resource blocks (PRBs) out of a 20 MHz LBT bandwidth, 3 PRBs, or the other partial band).

In one aspect, processes 730 demonstrate that if the resource is reserved (e.g., at reservations 718*a-c*) by UE 110-1, then the other UE (e.g., 110-2) in SL-U communication (e.g., a peer UE) could freeze their counter and stop the CCA procedure 704*a* that overlaps the time of any reservation (e.g., reservation 718*a*). Then the UE 110-2, for example, could resume the CCA 704*b* for the CCA duration to sense channel idleness/occupancy or not, and any selected resource 712 utilized for transmission from the RSW 708.

In another aspect, as in processes 740 the UE 110-2 can still perform the entire CCA procedure 710 and whether there is a collision or not depends on how the resource sensing results. As such, the UE 110-2, for example, can still perform CCA 710 on the time slot with reservation (e.g., 722*a, b* of 722 a-c). As such, if a partial bandwidth transmission can be enabled/allocated, and part of the partial band is already reserved, then rather than the entire CCA or slot being frozen for CCA sensing 710, CCA sensing could still be enabled to ensure efficiency so the other UE sensing procedure is not considerably slowed otherwise. The UE can then transmit (e.g., with the selected resource 714), and the peer or other UE of the SL-U operate efficiently with the same or different behavior as well.

Figure 8:
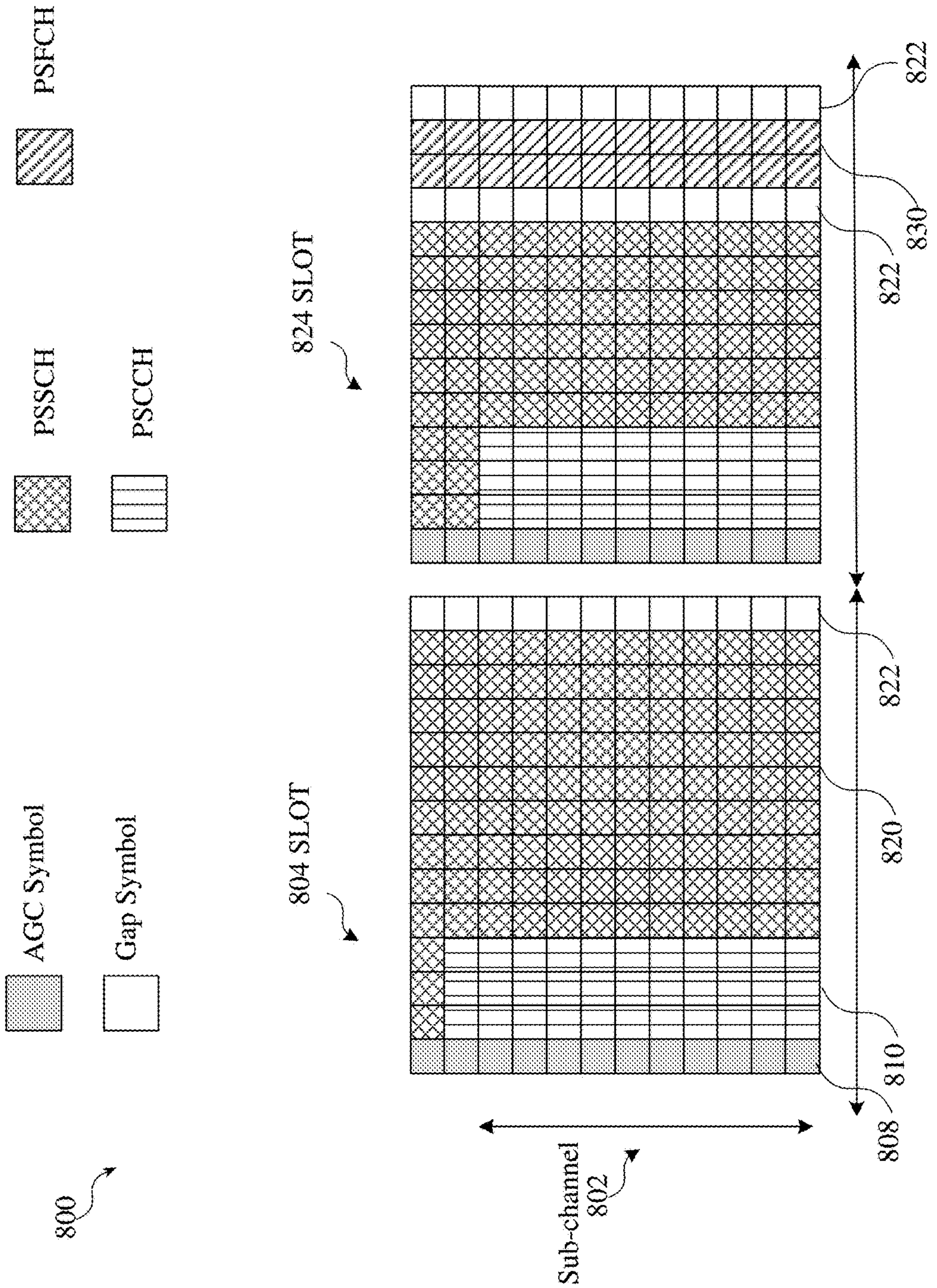
FIG. 8 illustrates an example of listen before talk (LBT) operation with respect to a gap symbol and starting position for mode 1 or mode 2 sidelink communication in accordance with various aspects.

FIG. 8 illustrates an example of LBT gap configuration for SL communications in mode 2 or mode 1 with a configured grant (CG) configuration. An SL slot can be configured with SCI for SL communications in an NR unlicensed network between an initiating UE (e.g., 110-1) and a receiving UE (e.g., 110-2, for example. The SL slot 804 can include, for example, 14 symbols that each include resource blocks spanning the vertical axis of each subchannel 802. Some symbols include PSCCH 810, PSSCH 820, and PSFCH 830, for example, in which PSSCH 820 can occupy up to 10 physical resource blocks (PRBs), as illustrated, or alternatively, up to 12, 15, 20, 25, etc. PRBs. The SL slot 804 includes resources with PSCCH 810 and PSSCH 820, as well as an automatic gain control (AGC) symbol as a first symbol 808 and a gap symbol 822, while the SL slot 824 include more gap symbols 822 with PSFCH symbols 830 there-between. The SL slots 804 or 824 can be configured with more or less symbols, and be transmitted in a smaller or large time block, for example, in other applications.

The SL slot 804 includes a first symbol 808 comprising the AGC symbol 808, which can be a copy of the second symbol. Following symbols include a first stage SCI or stage 1 SCI on PSCCH 810 that contains information to enable sensing operations, as well as information about the resource allocation of the PSSCH. The SCI (e.g., SCI Format 1A) can include stage 1 or first stage SCI on PSCCH 810 with various information for sensing and resource mapping. The SL slot 804 further includes the second stage SCI on PSSCH 820, which can be multiplexed with the PSCCH 810. The second stage SCI carries information for the receiving UE to identify and decode the associated SL channel, as well as control for HARQ procedures, and triggers for CSI feedback and the like.

The last symbol in the SL slot 800 is a gap symbol 822, not transmitted by the transmitter. The gap symbol 822 can be used to allow some time for a transmitter to receive (Tx-to-Rx) turnaround. When a UE performs the type 1 CCA, if the UE 110 completes the CCA before the allocated resource, the UE can operate to freeze the counter and then perform a one shot LBT (e.g., type 2 CCA) before the allocated resource to evaluate the SL channel. If successful and the channel is available, the SL transmission with the resource can start. The SL PHY structure can be configured to have a gap symbol 822 or the like that is longer than 25 us (microseconds).

In an aspect, the time within the gap symbol 822 (e.g., 25 us or longer than 25 us) for performing an LBT (e.g., type 2 LBT) could be configured differently. In first example, a last 25 us of the gap symbol can be used for LBT. SL transmission can thus start immediately after the LBT is successful, as with the gap symbol 822 in the slot 804. In second example, the beginning 25 us of the gap symbol 822 can used for LBT. After the sensing a cyclic prefix (CP) extension can be used before the actual slot 804 boundary to fill the gap 822, in which the transmission can then start. In third example, the UE 110 can randomly select a position within the gap symbol 822, such as from a group consisting of: 0, 9 us, 18 us, 27 us, 36 us, 45 us, 54 us, for example, as possible options to randomly select from to perform the LBT. A CP extension can then be used before the actual end boundary of slot 804, for example, to fill in the difference. The second example likely has a good or best chance of LBT/CCA success, in which the CP extension can block other UE CCA success to reduce potential inference.

In one aspect, the first example (a last 25 us of gap symbol 822 being used for LBT or type 2 CCA) can be utilized when resource allocation is partial as a partial LBT bandwidth, or a part of a 20 MHz sidelink resource allocation, for example. Alternatively, or additionally, the third example (randomly selecting a position within the gap symbol 822, such as from a group consisting of: 0, 9 us, 18 us, 27 us, 36 us, 45 us, 54 us for LBT) can be utilized when resource allocation is a full SL resource allocation being allocated as a full LBT bandwidth, such as 20 or 30 MHz sidelink resource allocation. If the full bandwidth is already started the UE 110 can naturally block all other potential interference from the start of transmission and reduce radio interference from other UEs. However, utilizing a last 25 us of a gap symbol when a partial LBT bandwidth is being allocated has advantages because it allows multiple FDM resource to transmit at the same time.

Therefore, depending on the SL resource allocation for LBT, whether SL resource allocation is for a partial bandwidth (e.g., less than 20 MHz), or a full complete LBT bandwidth (e.g., 20 MHz or more), the UE 110 can determine whether the LBT for SL communication is to be configured in the last 25 us of a gap symbol 822 or randomly selected at a position within the gap symbol 822 from the group (e.g., 0, 9 us, 18 us, 27 us, 36 us, 45 us, 54 us for LBT).

In an aspect, a sensing starting position and a CP extension can be based on a priority of the SL-U transmission, either a layer 1 (L1)-priority or CAPC of the SL-U transmission. The L1-priority is implicitly linked to CAPC via PQI (PC5 QoS Indentifier). The LBT gap type can have an L1 priority, which is the signaling in SCI stage 1 related to transmission. A higher priority can be associated with 1 and lower priory decrease down to 7, for example. Therefore, the L1 priority can be tied to the starting position so that a higher priority starts earlier and a lower priority starts sensing later. Starting sensing operations earlier can mean a higher chance for success, compared to a lower priority where sensing starts late, which means a greater chance that if there are any UEs selecting in the same resource that have higher priority, these start sensing first compared to a lower priority to start. Thus, sensing in the LBT gap can be linked with L1 priority configurations.

Figure 9:
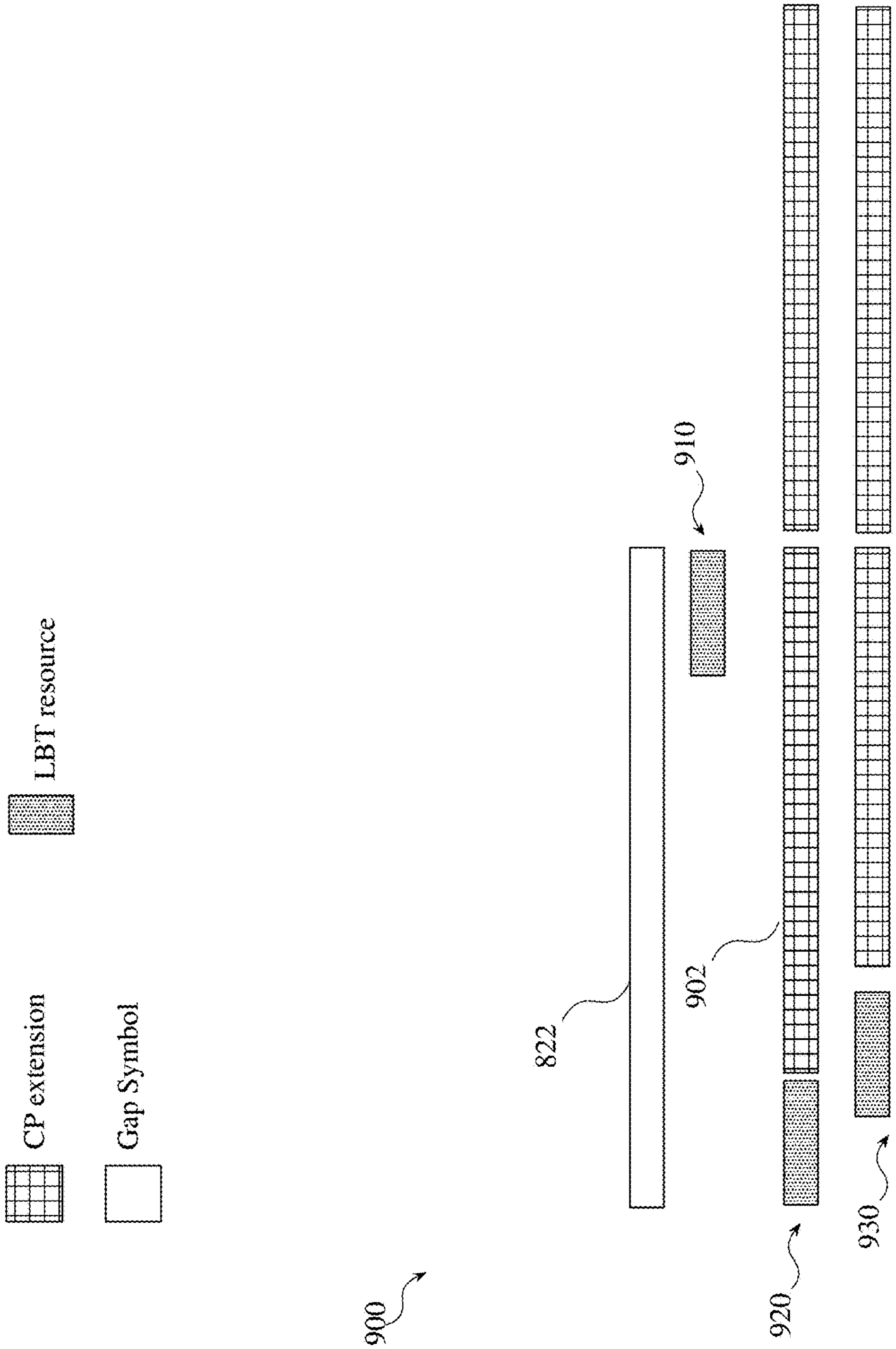
FIG. 9 illustrates another example of listen before talk (LBT) operation with respect to a gap symbol and starting position for mode 1 or mode 2 sidelink communication in accordance with various aspects.

As stated above, the actual sensing position for LBT and the CP extension (CPE) is related to L1-priority of the SL-U transmission. The LBT sensing slot can be immediately before the CPE starting position, as illustrated in FIG. 9. For example, if L1-priority=1: CPE transmission starts at 0 us of the gap symbol; if L1-priority=2: CPE transmission starts at 9 us of the gap symbol; if L1-priority=3: CPE transmission starts at 18 us of the gap symbol, and so on for L1-priority=4, at 27 us; L1-priority=5, at 36 us; L1 priority=6, 45 us, such that if L1-priority=7: CPE transmission starts at 54 us of the gap symbol. In another aspect, when a full LBT BW is allocated, instead of random selecting a positioning within the symbol, sensing starting position can be determined by the L1-priority. And when a partial BW is allocated, the first example (e.g., where a last 25 us of gap symbol 822 being used for LBT or type 2 CCA) can be utilized, if CAPC is used for traffic priority.

FIG. 9 illustrates different examples for LBT gap and starting positions 900 as described above for SL communications in mode 1 and mode 2 as in FIG. 8. A symbol 902 is illustrated, which can, depending upon numerology, for example, be 15 kHz subcarrier spacing (SCS), at about 70 or 71 us long for one symbol for the selected resource transmissions. Various aspects can be used for determining which part of the resource the 25 us is used for LBT. At 910, a last 25 us of gap symbol 822 can be used for LBT or type 2 CCA. At 920, the beginning 25 us can be used for LBT, with a CP extension 902 being used before the actual slot boundary to fill in the gap. At 930, the third example is illustrated to demonstrate a random selection position somewhere from among [0, 9 us, 18 us, 27 us, 36 us, 45 us, 54 us] to perform the LBT. If the UE selects with a higher priority, it thus starts earlier, and a lower priority starts later in time with a less chance of being successful.

Figure 10:
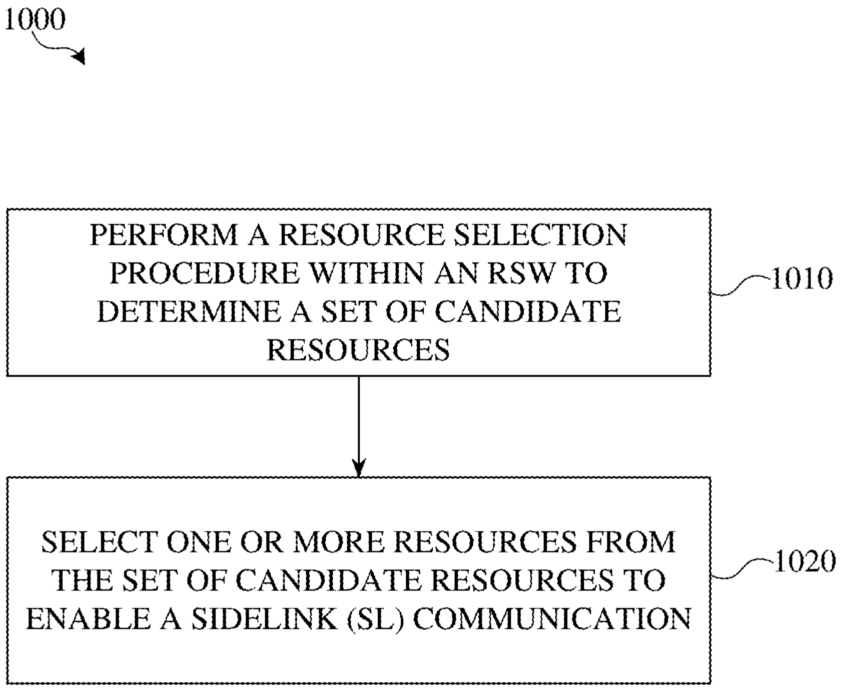
FIG. 10 illustrates an example of processes in determining SL communications in accordance with various aspects.

FIG. 10 illustrates an example process flow 1000 for SL communications in accord with various aspects. At 1010, the process flow 1000 begins with performing a resource selection procedure within a resource selection window (RSW) to determine a set of candidate resources. The RSW can initiate at a time that is during or after a CCA. Alternatively, or additionally, the CCA initiates after an aperiodic traffic arrival, after a previous transmission is completed, or after the resource selection is completed.

At 1020, one or more resources can be selected from the set of candidate resources to enable SL communication. The SL communication can comprise an autonomous determination of SL resources as a Mode-2 sidelink communication, in which traffic arrival is also aperiodic. The UE can initiate the CCA comprising a sidelink type 1 CCA with a random backoff number generation after a previous transmission completes and perform a resource selection of the one or more resources at a traffic arrival to a UE buffer. The sidelink type 1 CCA can also at least in partially overlap with the RSW.

The UE can also operate to initiate a countdown with a counter for the CCA before the traffic arrival, freeze the countdown of the counter upon traffic arrival, and perform a one shot CCA to initiate a transmission of a COT. In response to performing a resource re-selection, the CCA can begin after the resource re-selection completes, in which a gap occur between a traffic arrival and the CCA initiating.

Figure 11:
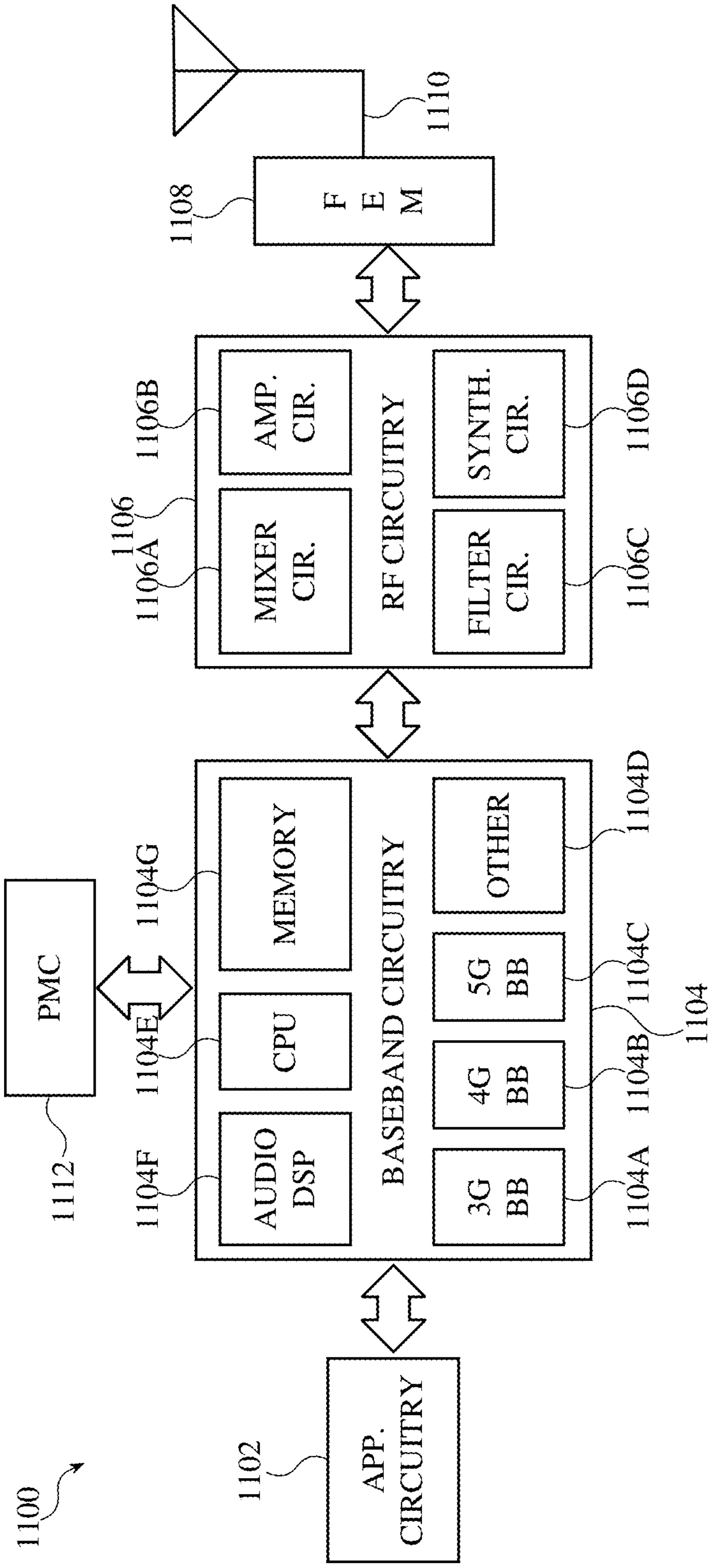
FIG. 11 illustrates a diagram illustrating example components of a device that can be employed in accordance with various aspects discussed herein.

FIG. 11 illustrates example components of a device 1100 in accordance with some aspects. In some aspects, the device 1100 can include application circuitry 1102, baseband circuitry 1104, Radio Frequency (RF) circuitry 1106, front-end module (FEM) circuitry 1108, one or more antennas 1110, and power management circuitry (PMC) 1112 coupled together at least as shown. The components of the illustrated device 1100 can be included in a UE or a RAN node. In some aspects, the device 1100 can include fewer elements (e.g., a RAN node cannot utilize application circuitry 1102, and instead include a processor/controller to process IP data received from a CN such as 5GC 130 or an Evolved Packet Core (EPC)). In some aspects, the device 1100 can include additional elements such as, for example, memory/storage, display, camera, sensor (including one or more temperature sensors, such as a single temperature sensor, a plurality of temperature sensors at different locations in device 1100, etc.), or input/output (I/O) interface. In other aspects, the components described below can be included in more than one device (e.g., said circuitries can be separately included in more than one device for Cloud-RAN (C-RAN) implementations).

The application circuitry 1102 can include one or more application processors. For example, the application circuitry 1102 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1100. In some aspects, processors of application circuitry 1102 can process IP data packets received from the core network or base station.

The baseband circuitry 1104 can include circuitry such as, but not limited to, one or more single-core or multi-core processors. The baseband circuitry 1104 can include one or more baseband processors or control logic to process baseband signals received from a receive signal path of the RF circuitry 1106 and to generate baseband signals for a transmit signal path of the RF circuitry 1106. Baseband circuitry 1104 can interface with the application circuitry 1102 for generation and processing of the baseband signals and for controlling operations of the RF circuitry 1106. For example, in some aspects, the baseband circuitry 1104 can include a third generation (3G) baseband processor 1104A, a fourth generation (4G) baseband processor 1104B, a fifth generation (5G) baseband processor 1104C, or other baseband processor(s) 1104D for other existing generations, generations in development or to be developed in the future (e.g., second generation (2G), sixth generation (6G), etc.). The baseband circuitry 1104 (e.g., one or more of baseband processors 1104A-D) can handle various radio control functions that enable communication with one or more radio networks via the RF circuitry 1106. In other aspects, some, or all of the functionality of baseband processors 1104A-D can be included in modules stored in the memory 1104G and executed via a Central Processing Unit 1104E. Memory 1104G can include executable components or instructions to cause one or more processors (e.g., baseband circuitry 1104) to perform aspects, processes or operations herein. The radio control functions can include, but are not limited to, signal modulation/demodulation, encoding/decoding, radio frequency shifting, etc. In some aspects, modulation/demodulation circuitry of the baseband circuitry 1104 can include Fast-Fourier Transform (FFT), precoding, or constellation mapping/demapping functionality. In some aspects, encoding/decoding circuitry of the baseband circuitry 1104 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1104 can include one or more audio digital signal processor(s) (DSP) 1104F. The audio DSP(s) 1104F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some, or all of the constituent components of the baseband circuitry 1104 and the application circuitry 1102 can be implemented together such as, for example, on a system on a chip (SOC).

In some aspects, the baseband circuitry 1104 can provide for communication compatible with one or more radio technologies. For example, in some aspects, the baseband circuitry 1104 can support communication with a NG-RAN, an evolved universal terrestrial radio access network (EUTRAN) or other wireless metropolitan area networks (WMAN), a wireless local area network (WLAN), a wireless personal area network (WPAN), etc. Aspects in which the baseband circuitry 1104 is configured to support radio communications of more than one wireless protocol can be referred to as multi-mode baseband circuitry.

RF circuitry 1106 can enable communication with wireless networks using modulated electromagnetic radiation through a non-solid medium. In various aspects, the RF circuitry 1106 can include switches, filters, amplifiers, etc. to facilitate the communication with the wireless network. RF circuitry 1106 can include a receive signal path which can include circuitry to down-convert RF signals received from the FEM circuitry 1108 and provide baseband signals to the baseband circuitry 1104. RF circuitry 1106 can also include a transmit signal path which can include circuitry to up-convert baseband signals provided by the baseband circuitry 1104 and provide RF output signals to the FEM circuitry 1108 for transmission.

In an aspect, RF circuitry 1106 can include baseband processor(s) or processing circuitry that can include a processor with memory that can be configured to communicate in SL communication. The processing circuitry can execute instructions to perform a resource selection procedure within a RSW to determine candidate resources. The RSW can be configured to initiate at a time that is during or after a CCA. Additionally, or alternatively, the CCA can initiate at a time of at least one of: after an aperiodic traffic arrival, after a previous transmission is completed, or after the resource selection is completed. In some aspects, the traffic can be aperiodic, arriving in the UE buffer (e.g., storage 1104G, internal to processor or processing circuitry or external thereto) at different intervals, or periodic, arriving in the UE buffer at regular intervals. Then the UE can select one or more resources from the set of candidate resources to enable the SL communication, which can be a mode 2 SL communication where SL resources are without a base station or autonomously determined.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular embodiment, aspect or example provided within this disclosure and can be applied to any of the systems/devices/components disclosed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure is described with reference to attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can be also a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A user equipment (UE), comprising:

a memory; and a processing circuitry, coupled to the memory, configured to, when executing instructions stored in the memory, cause the UE to:

perform, in response to completion of a previous transmission, a clear channel assessment (CCA) procedure that includes generating a random backoff number and initiating a countdown with a counter for the CCA before traffic for a sidelink (SL) communication arrives at the UE;

in response to the traffic arrival, perform a resource selection procedure within a resource selection window (RSW) to select one or more resources from a set of candidate resources, wherein the RSW initiates during or after the CCA;

upon CCA success, freeze the countdown of the counter prior to the selected resources; and perform a one-shot listen before talk (LBT) operation within a gap symbol preceding the selected resources with a cyclic prefix extension (CPE) starting position based on a priority of the SL communication; and after the LBT operation, transmit the SL communication using the selected resources.

2. The UE of claim 1, wherein the SL communication comprises an autonomous determination of SL resources as a Mode-2 sidelink communication.

3. The UE of claim 1, wherein the CCA procedure is a sidelink type 1 CCA and at least in part overlaps with the RSW.

4. The UE of claim 1, wherein the processing circuitry is further configured to:

in response to performing a resource re-selection, continue the countdown of the counter.

5. The UE of claim 1, wherein the processing circuitry is further configured to:

in response to performing a resource re-selection, restart the counter after the resource re-selection completes.

6. The UE of claim 1, wherein the processing circuitry is further configured to:

in response to traffic arrival being aperiodic:

enable a standalone reservation signal transmission that is independent of any previous transmission or reservation, and a UE buffer of the UE is without traffic for an initial transmission; and enable a reservation only for traffic within the UE buffer so that the reservation is piggy-backed or associated with the traffic within the UE buffer for the initial transmission; or disable a resource reservation for the initial transmission.

7. The UE of claim 1, wherein the processing circuitry is further configured to:

in response to mode 2 sidelink communication over an unlicensed channel:

disable a hybrid automatic repeat request (HARQ) retransmission reservation;

enable the HARQ retransmission reservation to be configured within a sidelink channel occupancy time (COT); or configure a COT length of the sidelink COT to be the HARQ retransmission reservation.

8. The UE of claim 1, wherein the processing circuitry is further configured to:

in response to the one or more resources being reserved, freeze the counter to stop the CCA overlapping the one or more resources being reserved.

9. The UE of claim 1, wherein the processing circuitry is further configured to:

in response to the one or more resources being reserved with a reservation, perform the CCA over one or more time slots of the one or more resources with the reservation.

10. The UE of claim 1, wherein the one-shot LBT operation is performed on a position randomly selected from a plurality of candidate positions within the gap symbol.

11. The UE of claim 1, wherein, in response to the selected resources comprising an entire LBT bandwidth, the one-shot LBT operation is performed on a position randomly selected from a plurality of candidate positions within the gap symbol; and wherein, in response to the selected resources comprising a partial LBT bandwidth, the one-shot LBT operation is performed on the last 25 microseconds of the gap symbol.

12. The UE of claim 1, wherein the priority is a layer 1 (L1) priority of the SL communication.

13. The UE of claim 1, wherein the one-shot LBT operation is performed on a beginning 25 microseconds or a last 25 microseconds of the gap symbol.

14. A method for resource selection in a sidelink (SL) communication, comprising:

in response to traffic for the SL communication arriving at a buffer, performing a resource selection procedure within a resource selection window (RSW) to determine a set of candidate resources, wherein the RSW initiates at a time that is during or after a clear channel assessment (CCA) procedure that includes generating a random backoff number;

selecting one or more resources from the set of candidate resources to enable the SL communication;

upon CCA success, freezing a countdown of a counter for the CCA procedure prior to the selected resources;

performing a listen before talk (LBT) operation with a cyclic prefix extension (CPE) starting position randomly selected from a plurality of candidate positions within a gap symbol preceding the selected resources based on a priority of the SL communication; and transmitting the SL communication after the LBT operation.

15. The method of claim 14, wherein the CCA initiates after a previous transmission is completed and prior to the traffic arrival.

16. The method of claim 14, further comprising:

in response to the traffic arrival being aperiodic:

enabling a standalone reservation signal transmission that is independent of any previous transmission or previous reservation and without traffic in a UE buffer for an initial transmission.

17. The method of claim 14, further comprising:

in response to the traffic arrival being aperiodic:

disabling a hybrid automatic request (HARQ) retransmission reservation;

enabling the HARQ retransmission reservation to be configured within a sidelink channel occupancy time (COT) to perform a type 2 CCA in a HARQ retransmission, wherein a maximum number of HARQ retransmissions is predefined or derived based on a gap length, a channel access priority class (CAPC), or physical sidelink feedback channel (PSFCH) timing; or configuring a COT length of the sidelink COT to be the HARQ retransmission reservation based on a sidelink control information (SCI) stage 1 signaling.

18. The method of claim 14, further comprising:

performing a resource re-selection; and after completion of the resource re-selection, delaying initiation of a subsequent CCA such that a gap exists between arrival of traffic at a buffer and initiation of the subsequent CCA.

19. A baseband processor comprising:

a processing circuitry configured to:

perform a type 1 clear channel assessment (CCA) that includes generating a random backoff number and initiating a countdown with a counter for the CCA;

perform a resource selection of one or more resources from a set of candidate resources to enable a sidelink (SL) communication, wherein the resource selection overlaps the CCA;

upon CCA success, freeze the countdown of the counter prior to the selected resources;

perform a one-shot listen before talk (LBT) operation within a gap symbol preceding the one or more resources with a cyclic prefix extension (CPE) starting position based on a priority of the SL communication; and perform the SL communication using the one or more resources after the LBT operation.

20. The baseband processor of claim 19, wherein, in response to a resource reselection, the processing circuitry maintains the countdown for the type 1 CCA or restarts the counter after the resource reselection.

21. The baseband processor of claim 19, wherein the processing circuitry is further configured to:

wherein the LBT operation is performed on a beginning 25 microseconds or a last 25 microseconds of the gap symbol.

22. The baseband processor of claim 19, wherein the

LBT operation is performed according to a random selection of the CPE starting position from a plurality of candidate positions within the gap symbol based on a layer 1 (L1) priority of the SL communication.

* * * * *